United States Patent [19]

Bullock, Sr.

[11] Patent Number: 5,496,617
[45] Date of Patent: Mar. 5, 1996

[54] METHOD OF MAKING REINFORCED CORRUGATED BOARD AND PRODUCT THEREFROM

[75] Inventor: Bobby T. Bullock, Sr., Marietta, Ga.

[73] Assignee: Mead, Smyrna, Ga.

[21] Appl. No.: 293,657

[22] Filed: Aug. 22, 1994

Related U.S. Application Data

[62] Division of Ser. No. 50,815, Apr. 22, 1993, Pat. No. 5,362,346.

[51] Int. Cl.$^6$ .................................................. B32B 3/28
[52] U.S. Cl. .................................................. 428/182; 428/184
[58] Field of Search .................................................. 428/182, 184, 428/47, 78, 114, 196, 304.4; 156/205; 52/795; 162/117, 296; 264/286, 5.5

[56] References Cited

U.S. PATENT DOCUMENTS

| | | | |
|---|---|---|---|
| 2,973,295 | 2/1961 | Rodgers | 428/182 |
| 3,741,859 | 6/1973 | Wandel | 428/182 |
| 3,819,466 | 6/1974 | Winfield et al. | 428/182 |
| 3,892,613 | 7/1975 | McDonald et al. | 156/210 |
| 4,228,847 | 10/1980 | Lindahl | 165/10 |
| 4,274,905 | 6/1981 | Itoh et al. | 156/462 |
| 4,339,292 | 7/1982 | Itoh et al. | 156/206 |
| 4,358,498 | 11/1982 | Chavannes | 428/108 |
| 5,122,396 | 6/1992 | Rantanen | 427/359 |
| 5,316,828 | 5/1994 | Miller | 428/182 |

*Primary Examiner*—Donald J. Loney
*Attorney, Agent, or Firm*—Needle & Rosenberg

[57] ABSTRACT

A method of making a reinforced corrugated board and product therefrom whereby both a single-faced corrugated board and a reinforcing strip are passed through the same adhesive station, before being secured together with a facing liner. The reinforcing strip is passed below the path of the single-faced corrugated board so as to coat both the top and bottom surfaces of the reinforcing strip and the upper, faced surface of the corrugated board. The members are then passed together with a lower facing liner through a pair of pressure rollers serving to secure the layers. The reinforcing strip may also be narrower than the width of the corrugated board and facing liner, and furthermore, a plurality of reinforcing strips may be used.

10 Claims, 1 Drawing Sheet

U.S. Patent    Mar. 5, 1996    5,496,617
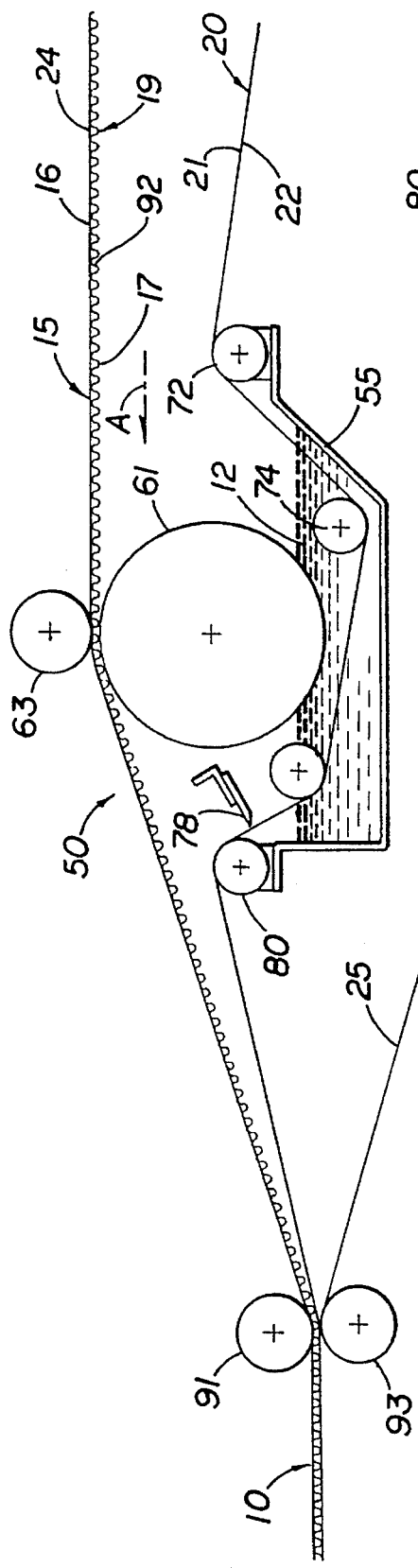
FIG. 1
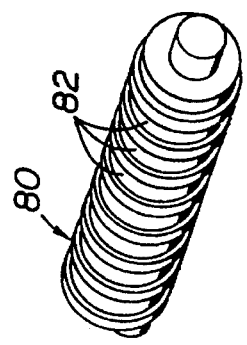
FIG. 4
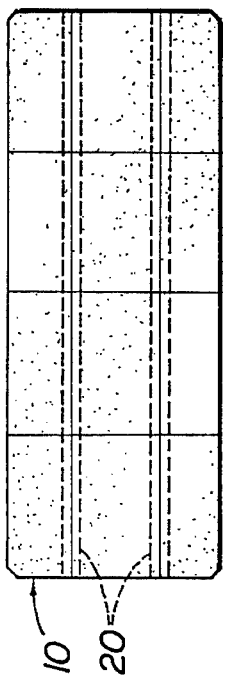
FIG. 5
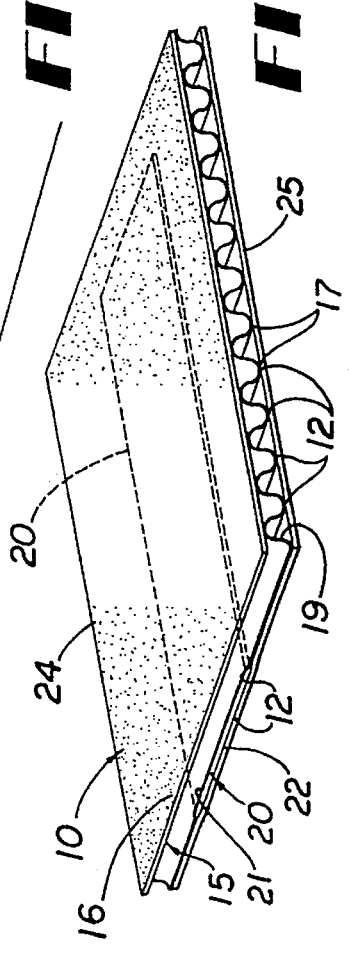
FIG. 2
FIG. 3

METHOD OF MAKING REINFORCED CORRUGATED BOARD AND PRODUCT THEREFROM

This application is a division of application Ser. No. 08/050,815, filed Apr. 22, 1993 now U.S. Pat. No. 5,362,346.

BACKGROUND OF THE INVENTION

The present invention relates to a method of making a dual-faced corrugated paperboard which has at least one reinforcing strip located within the paperboard layers and product therefrom, and more particularly, to such a method and product requiring the use of only a single adhesive station.

Corrugated board is available in various grades of thickness, including single-, double-, or triple-walled, as well as in single- or double-faced configurations. A single-faced corrugated board has one smooth liner board side adhered to an opposite exposed corrugated side. Due to certain packaging and shipping requirements, it is sometimes desirable to produce corrugated board with discrete regions of reinforced thickness. This structure affords increased resistance to crushing forces in those areas protecting fragile contents therein, yet minimizes the additional material costs of reinforcing the entire carton.

A cardboard carton may be strengthened thus by selectively inserting strips of a reinforcing material between layers of corrugated board and facing liner in only those regions where additional strength is desired. However, as such a reinforced corrugated board is currently manufactured in the prior art, multiple gluing stations are required, which unnecessarily duplicates production steps and requires additional manufacturing materials.

SUMMARY OF THE INVENTION

The reinforced corrugated board is made by passing the lower corrugated surface of the single-faced corrugated board member across a roller which is partially submerged in the adhesive medium at an adhesive station and simultaneously passing the reinforcing strip through the adhesive medium of the same adhesive station directly beneath the roller. Excess adhesive may be removed from the lower surface of the single-faced corrugated board member and the top of the reinforcing strip. Then, the adhesive-coated single-faced corrugated board, the adhesive-coated reinforcing strip and a lower facing liner are secured together in layers to make a reinforced corrugated board. The reinforcing strip may have a width which is less than the width of the other members of the board. The reinforcing strip may also be narrower than the width of the corrugated board and facing liner, and furthermore, a plurality of reinforcing strips may be used.

Therefore, it is an object of the invention to provide a method for making reinforced corrugated board which features only one adhesive station for coating both a single-faced corrugated board and a reinforcing strip.

It is also an object of the present invention to provide a means for directing the reinforcing strip through the adhesive station while the single-faced corrugated board passes through the same adhesive station.

Furthermore, this invention also provides methods for coating and removing excess adhesive from the members that pass through the adhesive station.

BRIEF DESCRIPTION OF THE FIGURES OF DRAWINGS

FIG. 1 is a schematic view of the method and apparatus according to the invention;

FIG. 2 is a schematized elevational, sectional view of a board of the present invention;

FIG. 3 is a longitudinally extending, vertical cross-sectional view of a double-walled embodiment of a board of the present invention;

FIG. 4 is a sectional frontal view of a stationary grooved rod used for coating the reinforcing strip according to the invention; and FIG. 5 is a top plan view of a board of the present invention.

DETAILED DESCRIPTION OF THE ILLUSTRATIVE EMBODIMENT

As shown in FIG. 2, the reinforced corrugated board produced by the method of the invention is denoted generally as the numeral 10. The reinforced corrugated board 10 comprises a single-faced corrugated paperboard member 15, a reinforcing strip 20 and a facing liner 25 secured together in layers from top to bottom with an adhesive 12.

The single-faced corrugated paperboard member 15 is commercially available as a prefabricated material constructed from a sheet of facing 24 serving as a substrate for gluing thereto a corrugated medium 19, which has been formed into a series of arches 92. The single-faced corrugated paperboard member 15 has both an upper surface 16 and a lower surface 17.

In FIG. 3, the reinforced corrugated board 10 has been secured to a second single-faced corrugated paperboard member 35 in order to form a double wall for increased structural integrity. The present invention contemplates a plurality of combinations of reinforced corrugated boards with additional single-faced corrugated paperboard members 35 or additional reinforced corrugated boards 10.

The reinforcing strip 20 may be selected from a variety of materials that exhibit the requisite qualities of strength, flexibility and surface texture capable of retaining and bonding an adhesive 12 coating. The present invention utilizes a thin paperboard similar to a facing liner 25, or facing 24; however, a reinforcing strip 20 made of another suitable material, such as porous plastic or metal, may also be used. The reinforcing strip 20 may be narrower than the single-faced corrugated paperboard member 15 and the facing liner 25 in order to provide additional reinforcing strength to only desired areas of the reinforced corrugated board 10. The top surface 21 of the reinforcing strip 20 is secured to the lower corrugated surface 17 of the single-faced corrugated paperboard member 15 with the adhesive 12. The facing liner 25 is also planarly secured to the bottom surface 22 of the reinforcing strip 20 with the adhesive 12.

The adhesive 12 may be selected according to the materials used in construction from a variety of adhesives which coat easily and bond strongly after hardening, such as: synthetic resins, including polyvinyl acetate, polyvinyl chloride, polyolefin, acrylate resins or styrol resins, and their polymers, copolymers or their compounds; and synthetic rubbers or natural high polymerized compounds including ester gum, starch and CMC, etc., and their solutions, emulsions or compounds. Furthermore, adhesives which give stiffness and water-proofness to the reinforced corrugated board may be useful, such as: the emulsion of styrol resin (50% of monomeric percentage) in which the plasticizer of 20% to 30% solid contents or the emulsion plasticizer is added.

FIG. 5 illustrates a top plan view of the reinforced corrugated board 10 partially cut away to reveal a pair of parallel reinforcing strips 20, 20. Each reinforcing strip 20 may be pre-selected for width to provide the reinforced corrugated board 10 with additional reinforcement only in those areas where it will be needed. The specific embodiment in FIG. 5 shows a configuration in which the pair of parallel reinforcing strips 20, 20 are both 1½ inches wide and are separated by 4 inches of non-reinforced board between them.

In FIG. 1, the preferred method of making a reinforced corrugated board 10 is schematically depicted. An adhesive station 50 is positioned to receive both the single-faced corrugated paperboard member 15 and the reinforcing strip 20 which are passed in the direction of the arrow A. The single-faced corrugated paperboard member 15 is contacted by an adhesive coating roller 61 on the lower corrugated surface 17 and an opposed stabilizing roller 63 on the upper surface 16. Adhesive 12, contained in the adhesive reservoir 55, is carried on the adhesive coating roller 61 and transferred to the lower corrugated surface 17, while the stabilizing roller 63 assists in maintaining even pressure and adhesive coating. The invention contemplates other suitable coaters, which will coat adhesive on only the lower corrugated side 17. After contacting adhesive coating roller 61, the single-faced corrugated paperboard member 15 becomes adhesive-coated.

The reinforcing strip 20 becomes adhesive-coated on both the top surface 21 and the bottom surface 22 by passing through the adhesive station 50 beneath and in alignment with the route of the single-faced corrugated paperboard member 15 simultaneously with the passage of the member 15 therethrough. To assist submerging the reinforcing strip 20, guides 72, 74 are present on the adhesive station 50. The guides 72, 74 may either be pivotally mounted to the adhesive station 50 so as to rotate about their respective horizontal axes, or mounted in a fixed position. In the specific embodiment of FIG. 1, guide 72 receives the bottom surface 22 of the reinforcing strip 20, which moves in the direction of the arrow A and is made of 1½ inch diameter plastic. Guide 72 is mounted in a fixed position on the adhesive station 50. The reinforcing strip 20 passes across the top of guide 72 into the adhesive 12 in the adhesive reservoir 55 and beneath guide 74. Guide 74 may be made of 2 inch diameter black iron pipe as embodied, or other suitable material, and is anchored to the adhesive station 50 in a fixed position so that as the reinforcing strip 20 is passed beneath guide 74, it is also directed beneath the adhesive coating roller 61.

The reinforcing strip 20 continues to be passed from the adhesive 12 to a doctor blade 78, then to a stationary grooved rod 80, before exiting the adhesive station 50. The doctor blade 78 serves to regulate the amount of adhesive 12 on the top surface 21 of the adhesive-coated reinforcing strip 20 by removing excess amounts. As seen in FIG. 4, the stationary grooved rod 80 serves to regulate the amount of adhesive 12 on the bottom surface 22 of the reinforcing strip 20. The specific embodiment of the grooved rod 80 is constructed of 2 inch diameter black iron pipe with a plurality of ⅛ inch deep by ⅛ inch wide grooves 82 therein spaced ¼ inch apart. The grooves 82 remove a portion of the adhesive 12 from the bottom surface 22 of the strip 20 and leave lines of adhesive 12 thereon.

As the adhesive-coated single-faced corrugated paperboard member 15 and the adhesive-coated reinforcing strip 20 are directed away from the adhesive station 50, a facing liner 25 is passed in the same direction beneath the bottom surface 22 of the reinforcing strip 20 exteriorly of the adhesive station 50. All three layers 15, 20 and 25 are then contacted with one another to form a reinforced corrugated board 10. In FIG. 1, a pair of pressure rollers 91 and 93 assist in securing the reinforced corrugated board 10 together by passing the adhesive-coated single-faced corrugated paperboard member 15, the adhesive-coated reinforcing strip 20, and the facing liner 25 therebetween. The reinforced corrugated board 10 may be heated and cooled thereafter to increase drying and strengthening of the adhesive 12. The reinforced corrugated board 10 is passed to a cutting means (not shown) for trimming and carton forming.

The present invention may also be practiced in conjunction with conventional adhering methods of securing one or more additional layers of single-faced corrugated paperboard 35 to the upper surface 16 of the first single-faced corrugated paperboard member 15 of the reinforced corrugated board 10. For instance, adhesive from a second adhesive station (not shown) could be applied to the bottom surface of a second corrugated member (not shown) which could then be contacted with the upper surface of corrugated paperboard member 15.

What I claim is:

1. A reinforced corrugated board, comprising:
   a. a first corrugated board member having a first upper faced surface and an opposite first lower corrugated surface;
   b. a non-adhesive reinforcing strip co-planar with said first faced surface having a top surface secured to the first lower corrugated surface of the first corrugated member, and an opposite bottom surface; and
   c. a non-adhesive facing liner secured to the bottom surface of the reinforcing strip; and
   d. an adhesive disposed both between the first lower corrugated surface and the top surface of the reinforcing strip, and between the bottom surface of the reinforcing strip and the facing liner.

2. A reinforced corrugated board as in claim 1, wherein the reinforcing strip is comprised of a porous material.

3. A reinforced corrugated board as in claim 1, wherein the reinforcing strip is narrower than the width of the entire reinforced corrugated board.

4. A reinforced corrugated board as in claim 1, and further comprising a second corrugated member having a second upper faced surface and a second lower corrugated surface, the second lower corrugated surface secured to the first upper faced surface of the first corrugated member.

5. A reinforced corrugated board comprising a first and a second reinforced corrugated board as in claim 1, wherein a surface of the first board is secured to a surface of the second board.

6. The reinforced corrugated board of claim 1 produced by a method comprising the steps of:
   a. passing a first corrugated member with a first upper surface and a first lower corrugated surface through a primary adhesive station whereby the first lower corrugated surface is coated with adhesive;
   b. moving, simultaneously with the passing step, a reinforcing strip with a top surface and a bottom surface through the primary adhesive station below and in alignment with the first corrugated member, whereby the top surface and the bottom surface of the reinforcing strip are coated with adhesive;
   c. directing a facing liner having a top surface and a bottom surface below and in alignment with the bottom surface of the adhesive-coated reinforcing strip exteriorly of the primary adhesive station; and d. contacting the adhesive-coated first lower surface of the first corrugated member with the adhesive-coated top surface of the reinforcing strip, and the adhesive-coated bottom surface of the reinforcing strip with the top surface of the facing liner.

7. The reinforced corrugated board of claim 6, wherein the method further comprises the step of removing excess adhesive from the adhesive-coated top surface of the reinforcing strip prior to the contacting step.

8. The reinforced corrugated board of claim 6, wherein the method further comprises the step of directing the adhesive-coated bottom surface of the reinforcing strip across a stationary grooved rod having a plurality of spaced grooves which are parallel to the direction of movement of the reinforcing strip prior to the contacting step.

9. The reinforced corrugated board of claim 6, wherein the method further comprises the step of passing the adhesive-coated first corrugated member, the adhesive-coated reinforcing strip, and the facing liner through a pair of opposed pressure rollers, thereby securing the single-faced corrugated board, the reinforcing strip, and the facing liner together.

10. The reinforced corrugated board of claim 6, wherein the method further comprises the step of passing a second lower corrugated surface of a second corrugated member through a secondary adhesive station, thereby coating the second lower corrugated surface, and contacting the adhesive-coated second lower surface of the second corrugated member with the upper surface of the first corrugated member.

* * * * *